United States Patent

[11] 3,617,861

[72] Inventors David E. Ford, Jr.
Milwaukee;
Richard W. Waltz, New Berlin, both of Wis.

[21] Appl. No. 9,216
[22] Filed Feb. 6, 1970
[45] Patented Nov. 2, 1971
[73] Assignee Allen-Bradley Company
Milwaukee, Wis.

[54] CIRCUIT FOR SUMMING ELECTRICALLY ISOLATED SIGNALS
6 Claims, 1 Drawing Fig.

[52] U.S. Cl. .......... 323/33, 307/240, 307/252 N, 318/227, 318/230, 328/127, 328/158
[51] Int. Cl. .......... H02p 13/16, H02m 5/28
[50] Field of Search .......... 323/31, 33; 307/218, 240, 242, 243, 252 N, 252 Q, 235; 318/227, 230; 328/127, 158

[56] References Cited
UNITED STATES PATENTS
3,436,642 4/1969 Segsworth .......... 307/240 X

*Primary Examiner*—Gerald Goldberg
*Attorneys*—Thomas O. Kloehn and Arthur H. Seidel

ABSTRACT: A control circuit for an SCR that is capable of responding to a plurality of electrically isolated input signals has a summing circuit connected to its input terminals to sum functions of the input signals. The summed signals are phase synchronized with formed SCR in a Phase Shift Circuit. The synchronized signal is formed into pulse trains functional of the summed input signals. The pulse trains are shaped in a pulse firing signal, which is connected to the SCR gate. The summing circuit chops the DC input signals with a reference carrier and sums the resulting envelopes in the secondaries of output coupling transformers.

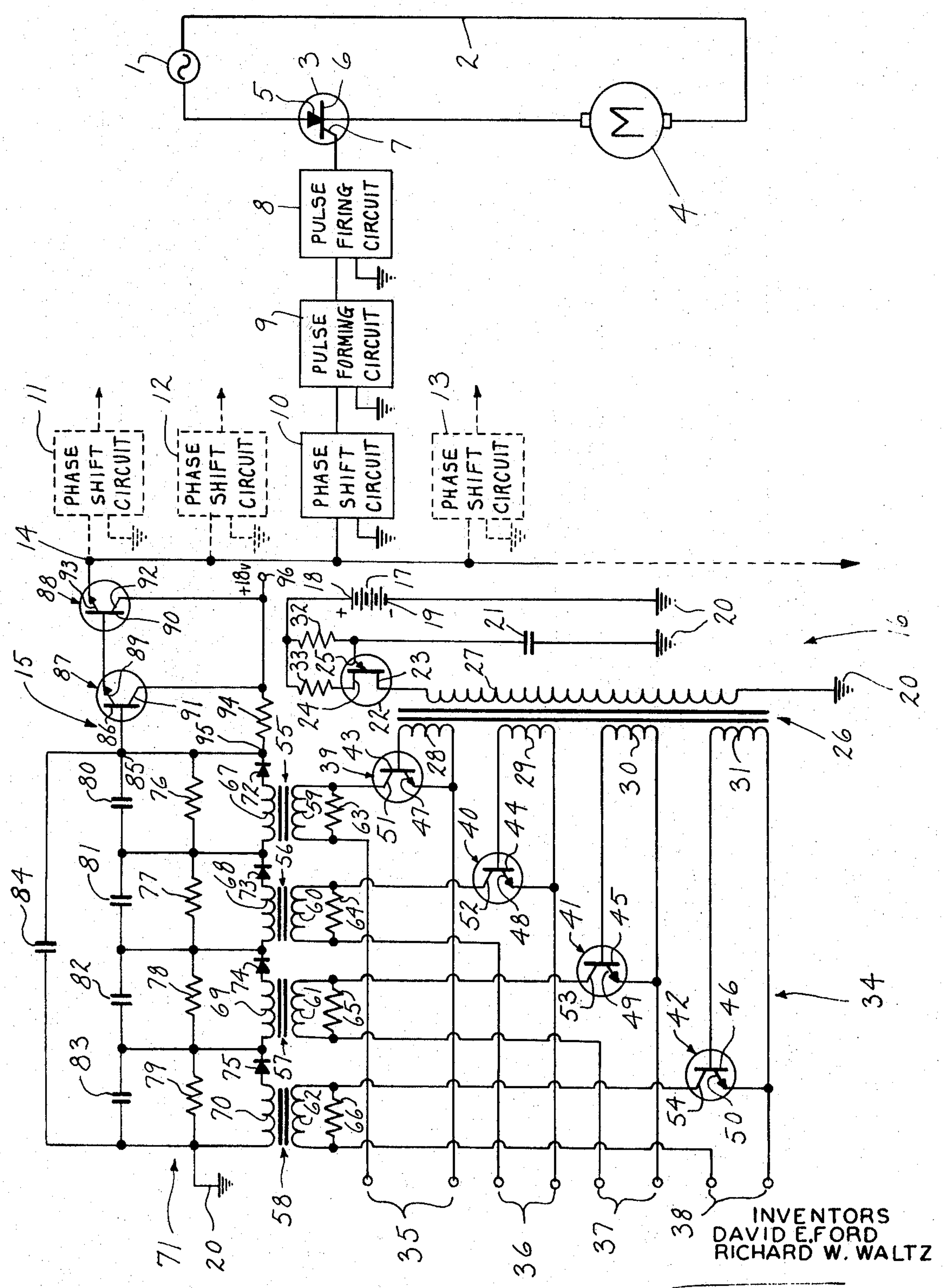
INVENTORS
DAVID E. FORD
RICHARD W. WALTZ
BY Thomas O. Klocker
ATTORNEY

CIRCUIT FOR SUMMING ELECTRICALLY ISOLATED SIGNALS

BACKGROUND OF THE INVENTION

There are numerous applications for circuits that can add together two or more electrical signals so as to obtain an output that is some function of the sum of those signals. The present invention grew out of the need for such a summing circuit in motor control applications, and particularly where it is anticipated that the motor control will be used on a machine tool. In such an application, the input signals to be summed could include command signals, feedback signals, signals indicating a variety of different conditions in the machine tool, or signals related to auxiliary functions, all of which may be summed to produce a control signal for controlling a motor. The copending application Ser. No. 9,213 filed Feb. 6, 1970 of the same inventors and owned by the same assignee as the present application, entitled "Controlled Rectifier Firing Circuit" details the circuitry between the summing circuit and the SCR that is connected in series between the power source and the motor to be controlled.

Frequently the input signals to be summed are electrically isolated from each other. In some applications, environmental conditions are such that the summing and control functions must be performed at a remote location from the motor being controlled and the machine generating the input signals, and in such situations it is often impractical and sometimes impossible to provide a common ground or reference for all of the input signals to be summed. Even in applications where the summing and control is performed at the site of the machine and the motor, it is nevertheless often impractical to provide a common reference or ground for the input signals. In such situations the input signals can not simply be combined together at the summing point. Hence, some means is needed to take these various input signals at their different reference levels and provide an accurate summation of the information they contain.

In years past, magnetic amplifiers have served as a convenient means for summing isolated input signals to control power on a line between a source and a load, such as a motor. However, magnetic amplifiers have a great many disadvantages, not the least of which are weight, bulk, cost, slow response and limitation to low frequencies. Hence, as the demand for controls has become increasingly sophisticated, the need for some other means of summing the increasing number of isolated input signals has grown. Particularly where the motor control designed as a standard package to meet any customer's needs, the requirement for versatility is paramount. The summing circuit must be capable of receiving any number of isolated input signals and summing them arithmetically or algebraically. The summing circuit must be lightweight, compact and economical, and commonly a solid-state device is indicated.

SUMMARY OF THE INVENTION

The present invention relates to a summing circuit capable of producing an output signal that is a function of a sum of a plurality of isolated input signals, and more specifically, the present invention relates to a summing circuit that includes a reference frequency source, a chopper stage which can receive a plurality of input signals to be summed and which is connected to the reference frequency source to receive a reference frequency and which chops the input signals with the reference frequency to produce a plurality of signal envelopes that are functions of the input signals, and the summing circuit includes restorer circuit which is coupled to the chopper to receive the plurality of envelopes from the chopper and which filters and sums the plurality of envelopes to produce an output signal that is a function of a sum of the envelopes.

A summing circuit that embodies the invention described in the preceding paragraph is capable of summing any number of isolated input signals to produce an output signal that may be used to control more than one circuit. The output signal received from such a summing circuit can be a function of the sum of the input signals, or it may be a function of a sum of functions of the input signals. Such a summing circuit is a static device which may be compact, lightweight, economical and capable of high-speed response so that it can operate on an extremely broad range of frequencies. This summing circuit is highly versatile and it is readily adapted to meet the specifications of a wide variety of systems, to operate in most anticipated environments, and it can be located either remotely or at the site of the machine and motor being controlled. Finally, insensitivity to noise is an important attribute of this summing circuit.

BRIEF DESCRIPTION OF THE DRAWINGS

The drawing is a schematic diagram illustrating in detail a summing circuit that embodies the present invention as applied in a block diagram of a motor control circuit.

DESCRIPTION OF THE PREFERRED EMBODIMENT

This embodiment of the invention is shown in a motor control system in which it is to be used, to control the power circuit that includes an AC source 1. A power line 2 connects the AC source 1 through an SCR 3 to a motor 4. The SCR 3 has an anode 5 connected to the source 1, a cathode 6 connected to he motor 4 and a gate 7 which receives the firing signal to govern the average power transmitted to the motor 4 from the source 1.

A pulse-firing circuit 8 is connected to the gate 7 of the SCR 3 and it is adapted to generate and transmit a train of firing pulses to the gate 7 of the SCR 3 to fire the SCR 3. The pulse firing circuit 8 is essentially an oscillator, the output of which is a precisely timed and shaped train of pulses, which is amplified and coupled to the gate 7 of the SCR 3.

A pulse-forming circuit 9 transmits a measured pulse of energy to the pulse-firing circuit 8 to govern the oscillator in the pulse-firing circuit 8. To achieve that end the pulse-forming circuit 9 includes a sensitive SCR inserted in the charge path of an oscillator capacitor in the pulse-firing circuit.

A phase shift circuit 10 controls the pulse-forming circuit 9, and the phase shift circuit 10 controls the pulse-forming circuit 9, and the phase shift circuit 10 is a timing circuit that functions to convert the DC magnitude of a command signal to a voltage spike that is so timed with respect to the AC power at the anode 5 of the power SCR 6 as to have a phase angle that is a function of the command signal. Three phantom phase shift circuits 11, 12 and 13 are illustrated in the drawing to represent any arbitrary number of SCR's that may be controlled by the output command signal from an embodiment of the present invention. Connected to each of the phase circuits 11, 12 and 13 would be another pulse-forming circuit and a pulse-firing circuit to fire other SCR's and thus control other power circuits. Each one of the other phase shift circuits 11, 12 and 13 would receive a synchronizing signal in phase with the power circuit is to control. The phase shift circuits 10–13 et seq. are connected to an output terminal 14 of a summing circuit 15 embodying the present invention.

The overall control circuit including the pulse firing 8, pulse-forming circuit 9, the pulse phase circuit 10 and the summing circuit 15, is capable of controlling any number of different power circuits. Through a single phase power circuit is represented in the drawing, actually a three-phase circuit is contemplated, and each phase would be controlled from the single summing circuit 15 by connecting it to the phantom phase shift circuits 11, 12 or 13 and synchronizing the phase shift circuit 11, 12 or 13 with a synchronizing signal of appropriate phase. Each phase could be controlled by more than one SCR, connecting them in parallel and firing them simultaneously from the circuit shown in the drawing. Manifestly and number of motors could be controlled simultaneously from the control circuit shown.

The summing circuit 15 of the present invention is made up of three stages, the first of which is an oscillator 16. The oscillator 16 is a relaxation oscillator powered by a DC power source 17, which is represented in the drawing by the symbol for a battery 17 with a positive terminal 18 and a negative terminal 19 that is connected to a common ground 20. The energy storage device for the oscillator 16 is a capacitor 21, and the nonlinear device for the oscillator capacitor is a unijunction transistor 22, which has a base-one 23, a base-two 24, and an emitter 25. A reference frequency is coupled out of the oscillator by a pulse transformer 26, a primary winding 27 of which is connected between the base-one 23 of the unijunction transistor 22 and common ground 20. In this embodiment, the pulse transformer 26 has four secondary windings 28, 29, 30 and 31, respectively, which are connected in the next stage of the summing circuit, but the number of secondary windings 28—31 is dictated by the need of the next stage. The oscillator capacitor 21 is connected on one side to the common ground 20, and on the other side to the positive terminal 18 of the DC source 17 through a time constant resistor 32. The base of the unijunction transistor 22 is connected across the DC source 17 by having its base-two 24 connected through a temperature stabilizing resistor 33 to the positive terminal 18 of the DC source 17 and its base-one 23 connected to common ground 20. Also, the emitter-25-base-one-23 junction of the unijunction transistor 22 is connected in parallel with he oscillator capacitor 21 across the DC source 17 through the time constant resistor 32, and will rapidly discharge the oscillator capacitor 21 through the primary 27 of the pulse transformer 26 when the charge level on the oscillator capacitor 21 reaches the peak point voltage for the unijunction transistor 22.

The secondaries 28–31 of the pulse transformer 26 are in chopper stage 34 of the summing circuit 15. The chopper stage 34 actually contains four choppers as represented by four pairs of input terminals 35, 36, 37 and 38 and four chopper transistors 39, 40 41 and 42. The four choppers are identical, and they are representative of any desired number of choppers corresponding to the number of input signals to be summed, the number four shown here being merely arbitrarily selected to illustrate the invention. In this embodiment for illustrative purposes, let it be assumed that there will be four input signals, one for each pair of input terminals 35–38 and hence there are four choppers. Each of the chopper transistors 39–42 has a base section 43, 44, 45 and 46, respectively, an emitter 47, 48, 49, and 50, respectively, and a collector 51, 52, 53 and 54, respectively. The base-43-emitter-47 circuit of the first chopper transistor 39 is connected across the first secondary 28 of the pulse transformer 26, the base-44-emitter-48 circuit of the second chopper transistor 40 is connected across the secondary 29 of the chopper transistor 26, the base-45-emitter-49 circuit of the third chopper transistor 41 is connected across the third secondary 30 of the pulse transformer 26, and the base-46-emitter-50 circuit of the fourth chopper transistor 42 is connected across the fourth secondary 31 of the pulse transformer 26. Thus, the reference frequency is imposed upon the base-emitter circuit of each of the choppers. The first pair of input terminals 35 is connected across the collector-51-emitter-47 circuit of the first chopper transistor 39, the second pair of input terminals 36 is connected across the collector-52-emitter-48 circuit of the second chopper transistor 40, the third pair of input terminals 37 is connected across the collector-53-emitter-49 circuit of the third chopper transistor 41 and the fourth pair of input terminals 38 is connected across the collector-54-emitter-50 circuit of the fourth chopper transistor 42.

With the reference frequency imposed upon the base-emitter circuit of each of the chopper transistors 39–42 and the input signal imposed on the collector-emitter circuit of each of the chopper transistors 39–42, the reference frequency chops the DC input signals creating signal envelopes. There are four chopper output coupling transformers 55, 56 57 and 58, each having a primary winding 59, 60 61 and 62 with damping resistor 63, 64, 65 and 66 in parallel across the respective primaries 59–62 and a secondary winding 67, 68, 69 and 70. The chopper output coupling transformers 55–58 are polarized pulse transformers. The primary 59 of the first output coupling transformer 55 is connected to the collector 51 of the first chopper transistor 39. The primary 60 of the second output coupling transformer 56 is connected to the collector 52 of the second chopper transistor 40. The primary 61 of the third output coupling transformer 57 is connected to the collector 53 of the third output coupling transformer 57 is connected to the collector 53 of the third chopper transistor 41, and the primary 62 of the last output coupling transformer 58 is connected to the collector 54 of the fourth chopper transistor 42.

The secondary windings 67–70 of the chopper output coupling transformers 55–58, respectively, are located in a summer and restorer 71. Each of the secondary 67, 68 69 and 70 has a diode 72, 73, 74 and 75, respectively, connected in series with it and the secondaries 67–70 are connected in series through the respective diodes 72–75. And the filter network includes a voltage drop resistor 76, 77, 78, and 79, respectively connected across each of the secondaries 67, 68, 69 and 70 and filter capacitors 80, 81, 82 and 83 respectively, connected in parallel with the drop resistors 76, 77, 78 and 79. A signal smoothing capacitor 84 is connected across all four secondaries 67–70, rectifiers 72–75, drop resistors 76–79, and filter capacitors 80–83. Thus the signal envelopes from each of the choppers on the coupling transformers 55–58 are filtered and summed together. One output junction 85 of the network is connected to base 86 of a first amplifier transistor 87 of two amplifier transistors 87 and 88. The two amplifier transistors 87 and 88 are cascaded as a Darlington pair by having an emitter 89 of the first amplifier transistor 87 connected to a base 90 of the second amplifier transistor 88 and collectors 91 an 92 of the two amplifier transistors 87 and 88, respectively, common connected to a second output junction 95 of the network through a bias resistor 94 and to a terminal 96 of a DC source. The second amplifier transistor 88 of the compound connected amplifier transistors 87 and 88 has its emitter 93 connected to the output terminal 14 of the summing circuit 15. This amplifier configuration allows circuit 15 to drive low impedance loads.

The operation of the summing circuit is implicit in the foregoing description of the circuitry of the embodiment, and may be summarized briefly here. In the relaxation oscillator 16, the DC power source 17 charges the capacitor 21 through the time constant resistor 32 until the voltage level of the capacitor 21 reaches the rated firing level for the unijunction transistor 22, when the oscillator capacitor 21 discharges rapidly through the emitter-25-to-base-one-23 circuit of the unijunction transistor 22 and the primary 27 of the pulse transformer 26. The frequency of the oscillator 16 is a function of the firing level of the unijunction transistor 22, the size of the time constant resistor 32 and the size of the capacitor 21. In this embodiment, the oscillator 16 provides a reference frequency of 5 kHz. The reference frequency is coupled out of the oscillator 16 into the chopper stage 34 through the pulse transformer 26 to each of the secondaries 28–31 across the base-emitter circuit of each of the chopper transistors 39–42. The reference frequency chops the input signals appearing at the input terminals 35–38 in the chopper transistors 39–42 to impress four signal envelopes, respectively, on the primaries 59–62 of the chopper coupling transformers 55–58. The envelopes are filtered in the secondary circuits of the secondary 67–70 of the coupling transformers 55–58, respectively, by the diodes 72–75 and the filter capacitors 80–84. The resistor 76–79 networks develop voltage drops proportionate to the envelopes and these are smoothed by the capacitors 80–83 and 84 so that the output junctions 85, 95 of the filter network present a waveform that is the summation of functions of the input signals on input terminals 35–38. This waveform is then amplified by the compound connected amplifier transistors 87–88 and appears on the output terminal 14 of the summing circuit 15.

The summing circuit may be modified in a number of ways to accommodate the needs of different applications. For example, the polarities of any one or more of the diodes 72–75 and the chopper output coupling transformers 55–58 may be reversed to provide addition or subtraction of the signals from he various choppers 39–42. Also, the primary 59–62 to secondary 67–70 turn ratios may be arbitrarily selected to provide a desired function of the sum. As has been mentioned, any number of choppers may be used in the chopper stage 34 depending upon the number of input signals to be summed. The summed output wave in this embodiment is amplified by the compound connected amplifier transistor 87 an 88, but this amplification stage may be omitted where it is not needed for amplification or impedance matching purposes, or a different type of amplifier may be used.

This concludes the written description of the invention and of the manner and process of making and using it, in full, clear, concise and direct terms so as to enable any person skilled in he art to which it pertains, or with which it is most nearly connected to make it use the same. The best mode presently contemplated by the inventors of carrying out their invention has been set forth in the foregoing description and its illustrated drawings. By contrast, the subject matter which the inventors regard as their invention is particularly pointed out and distinctly claimed in the claims that follow.

We claim:

1 . A summing circuit for summing a plurality of input signals comprising the combination of a reference frequency source;

a chopper stage including a plurality of choppers, each chopper being coupled to said reference frequency source to receive a reference frequency, each chopper having input terminals to receive an input signal, each chopper being adapted to combine said carrier frequency with said input signal to produce a signal envelope, and each chopper having chopper output coupling means;

and summer-restorer coupled to said chopper output coupling means to receive said signal envelopes and adapted to filter and sum said envelopes to produce an output signal that is a function of a sum of said input signals.

2. A summing circuit as set forth in claim 1 wherein each of said choppers has a transistor with its collector-emitter circuit connected to said input terminals and its base-emitter circuit connected to said reference frequency source.

3. A summing circuit as set forth in claim 2 wherein said chopper output coupling means is a transformer having a primary winding connected to a collector of said transistor.

4. A summing circuit as set forth in claim 1 wherein said summer-restorer has a diode connected to each of said chopper output coupling means, said chopper output coupling means are connected in series through said diodes with a drop resistor connected across each of said chopper output coupling means and diode, and a filter capacitor is connected across drop resistors.

5 A summing circuit as set forth in claim 4 wherein said reference frequency source is a relaxation oscillator with a capacitor and a unijunction transistor connected across a DC source and a pulse transformer with a primary winding connected in series with said unijunction transistor.

6. A summing circuit as set forth in claim 5 wherein each of said choppers in said chopper stage has a transistor with a base-emitter circuit connected across a secondary of said pulse transformer to receive said carrier frequency, an emitter-collector circuit connected across said input terminals to receive said input signal, and an output coupling transformer with primary connected in said emitter-collector circuit and a secondary connected in said output detector.

* * * * *

PO-1050
(5/69)

UNITED STATES PATENT OFFICE
CERTIFICATE OF CORRECTION

Patent No. 3,617,861 Dated November 2, 1971

Inventor(s) David E. Ford, Jr. and Richard W. Waltz

It is certified that error appears in the above-identified patent and that said Letters Patent are hereby corrected as shown below:

In the Abstract:
Line 5, change "formed" to --the--
Line 8, change "signal" to --circuit--

Col. 2, Line 28 change "he" to --the--
Col. 2, Line 44 after "10" delete entire line
Col. 2, Line 45 delete "cuit 9 and the phase shift circuit 10"
Col. 2, Line 59 after "circuit" insert --it--
Col. 2, Line 65 change "Through" to --Though--
Col. 2, Line 74 change "and" to --any--

Col. 3, Line 28 change "he" to --the--

Col. 4, Line 11 after "third" delete entire line
Col. 4, Line 12 delete "connected to the collector 53 of the third"
Col. 4, Line 21 after "75." insert --A filter network is connected across the secondaries 67-70 and diode 72-75, and-- and delete "And"
Col. 4, Line 37 change "an" to --and--

Col. 5, Line 8 change "he" to --the--
Col. 5, Line 21 change "he" to --the--

Signed and sealed this 1st day of August 1972.

(SEAL)
Attest:

EDWARD M.FLETCHER,JR.
Attesting Officer

ROBERT GOTTSCHALK
Commissioner of Patents